United States Patent
Marti et al.

(10) Patent No.: US 10,110,907 B2
(45) Date of Patent: Oct. 23, 2018

(54) METHOD AND SYSTEM FOR OPTIMIZED DELTA ENCODING

(71) Applicant: Swisscom AG, Bern (CH)

(72) Inventors: Urs-Viktor Marti, Munchenbuchsee (CH); Denis Schlauss, Wabern (CH); Lukas Hohl, Ostermundigen (CH); Beat Herrmann, Bern (CH)

(73) Assignee: Swisscom AG (CH)

( * ) Notice: Subject to any disclaimer, the term of this patent is extended or adjusted under 35 U.S.C. 154(b) by 0 days.

(21) Appl. No.: 15/661,019

(22) Filed: Jul. 27, 2017

(65) Prior Publication Data

US 2017/0324965 A1 Nov. 9, 2017

Related U.S. Application Data

(63) Continuation of application No. 15/181,803, filed on Jun. 14, 2016, now Pat. No. 9,743,094, which is a continuation of application No. 14/606,797, filed on Jan. 27, 2015, now Pat. No. 9,420,298, which is a continuation of application No. 13/729,346, filed on Dec. 28, 2012, now Pat. No. 8,971,643.

(30) Foreign Application Priority Data

Dec. 29, 2011 (EP) .................................. 11196029

(51) Int. Cl.
*G06K 9/00* (2006.01)
*H04N 19/177* (2014.01)
*H04N 19/119* (2014.01)
*H04N 19/50* (2014.01)
*H04N 19/90* (2014.01)
*H04N 19/114* (2014.01)

(52) U.S. Cl.
CPC ......... *H04N 19/177* (2014.11); *H04N 19/114* (2014.11); *H04N 19/119* (2014.11); *H04N 19/50* (2014.11); *H04N 19/90* (2014.11)

(58) Field of Classification Search
None
See application file for complete search history.

(56) References Cited

U.S. PATENT DOCUMENTS

| | | | | |
|---|---|---|---|---|
| 8,280,887 B1* | 10/2012 | Stork | ................ | G06F 17/30943 707/722 |
| 2005/0058361 A1* | 3/2005 | Tajima | .................. | G06T 3/4007 382/254 |

(Continued)

*Primary Examiner* — Hadi Akhavannik
(74) *Attorney, Agent, or Firm* — McAndrews, Held & Malloy, Ltd.

(57) ABSTRACT

Methods and systems are provided for image processing. A plurality of correlation parameters representing degrees of correlation between two or more images of a plurality of images may be produced. An optimized correlation dependency graph may be produced according to the plurality of correlation parameters. The plurality of images may then be delta encoded according to the optimized correlation dependency graph. For example, the optimized correlation dependency graph may be used for performing a correlation encoding operation. The plurality of correlation parameters may be produced, for example, in accordance with one or more correlation metrics associated with the correlation encoding operation.

20 Claims, 5 Drawing Sheets

(56) References Cited

U.S. PATENT DOCUMENTS

| | | | |
|---|---|---|---|
| 2009/0213930 A1* | 8/2009 | Ye | H04N 19/176 375/240.03 |
| 2009/0216793 A1* | 8/2009 | Szyperski | G06F 9/542 |
| 2010/0077077 A1* | 3/2010 | Devitt | H04L 41/147 709/224 |
| 2010/0086220 A1* | 4/2010 | Minear | G06K 9/741 382/218 |
| 2010/0220902 A1* | 9/2010 | Adler | G06F 17/15 382/128 |

* cited by examiner

METHOD AND SYSTEM FOR OPTIMIZED DELTA ENCODING

CROSS-REFERENCE TO RELATED APPLICATIONS/INCORPORATION BY REFERENCE

This application is a continuation of U.S. patent application Ser. No. 15/181,803, filed Jun. 14, 2016, which is a continuation of U.S. patent application Ser. No. 14/606,797, filed Jan. 27, 2015, now issued as U.S. Pat. No. 9,420,298), which is a continuation of U.S. patent application Ser. No. 13/729,346, now issued as U.S. Pat. No. 8,971,643, filed Dec. 18, 2012, which in turn claims priority to European Patent Application Serial No. 11196029.0, filed Dec. 29, 2011. Each of the above identified applications is hereby incorporated herein by reference in its entirety.

FIELD

The invention relates to the field of data encoding, for example for compressing data for transmission or storage. In particular, but not exclusively, it relates to delta or correlation encoding techniques.

BACKGROUND

Differential or delta encoding is commonly used in data processing, and is particularly useful for compressing strongly correlated, ordered data sets, such as sequences of video images. Since there is usually a strong correlation in content between the successive images in a video sequence, it is possible to achieve significant reduction in data traffic by only transmitting the difference between one image and the previous image, instead of transmitting each complete image.

Other applications for delta encoding include data backup systems, in which, instead of storing a complete new copy of the data to be backed up, an incremental backup can be created, in which only the differences to the previous backup are stored for the new backup.

Delta encoding techniques have also been proposed as a substitute, or supplement, for web page caching. In this case, a web-page may be cached locally by a browser, for example, and then, instead of refreshing entire web-pages when necessary, the browser and web server negotiate subsequent transactions such that only incremental changes to web-pages are communicated to the browser. Similarly, websites which are to be replicated (mirrored) in order to improve their accessibility and reliability, can be kept synchronized with each other, by exchanging only the (delta) content between the mirrored sites.

Correlation encoding may be lossless, in which case data is encoded in such a way that it is subsequently completely reconstitutable to its original state, or lossy, in which case certain approximations are made during the encoding process, with the result that the encoded data no longer contains all the information required to reconstitute the data in its original state. In general, lossy encoding offers a significantly greater compression rate than lossless encoding.

Modern mobile phones are capable of taking many photographs and uploading the photos via wireless internet connections. One reason why mobile phones and smartphones have become a major image capture device is that the quality of the photos taken with these cameras is increasing. There are many web-based services which allow users to archive and share their private photos. However, the necessary access bandwidth may be unavailable (or too expensive) to permit frequent uploading and storage of photos automatically in an internet-based photo management service, for example.

A problem for network based photo services (e.g. photo archives or photo sharing services) is that the upload of images may take a long time because of the large size (resolution) of the images. For archiving services the user usually wants to store the best quality available (raw images with high resolutions in space and color domain). With the limited upload bandwidths available using DSL or mobile networks, the process of image transfer can take a long time. In some cases the process may need to be scheduled in advance, and may take many hours.

Data sets, such as batches of images, are routinely compressed, for example when the data sets are to be archived or transmitted, and where it is important to reduce the amount of bandwidth or data storage space required for the transmission or storage of the data sets. General purpose data-compression algorithms, such as the well-known Lempel-Ziv algorithm and its successors, involve identifying recurring patterns of data in a batch of data, and building a dictionary of such patterns, such that each pattern can be referred to by its dictionary reference.

The term "data set" is used in this application to refer to any item of data which may be the subject of correlation processing with other items of data—for example processing for compression, analysis or other types of data manipulation. Several examples of such data sets are given in this application, such as a collection of photographs in a digital camera, which are to be uploaded to a web-server. Another example would be batch-processing of the content of a batch of digital images—if for example a user wishes to carry out an image enhancement operation such as sharpening or contrast-enhancement on all the images in the batch, or convert a batch of images from one color space to another. Batch processing in this context means performing the same operation, or the same type of operation, on a batch (plurality) of data-sets.

Another example of data sets is in the batch-processing of OCR (optical character recognition) documents. Text documents can be subjected to a correlation encoding process, for example, in which similar pieces of scanned text (phrases, words or word segments, for example), which occur multiple times in the scanned images, are encoded as references to entries in a dictionary. In this case, each data set may be a whole scanned image (e.g. a page), or it may be a section of an image, such as a part of a text document which has been identified as a word or other group of characters or symbols.

Another example of data sets might be a collection of diverse computer files in a directory. Groups of such files may be collectively subject to various forms of processing such as data compression, data backup, virus-checking, file-system defragmentation, synchronizing etc.

It is known to use general-purpose data-compression algorithms to compress such unordered data sets. Files, or batches of files, can be compressed using the ubiquitous Zip algorithm, for example, which losslessly generates a compressed file containing all the information required to reconstitute the original file or files.

It is often necessary to process such data sets in batches. For example, a folder of files may need to be copied in one operation from a computer's internal storage to an external storage device such as a USB stick. Or a batch of holiday photographs may need to be uploaded from a mobile phone (for example via a wireless mobile network) to a socialmedia website server. Or a collection of pages of text may need to be scanned and OCR'ed in one operation.

Each of these operations can be speeded up by reducing the amount of information to be processed. In the case of compressing batches of data sets for transfer, conventional methods either compress the data sets individually, in which case the data sets can be transferred individually but the compression is sub-optimal, or they can be compressed as one file, in which case the compression is improved but the files cannot be transferred individually. Similarly, in the case of the batch OCR example, the amount of processing to be carried out can be reduced by encoding the whole batch of pages. The larger the data sample to be encoded, the more efficient is the encoding, since the likelihood of similar patterns (and therefore greater correlation) recurring is greater.

Further limitations and disadvantages of conventional and traditional approaches will become apparent to one of skill in the art, through comparison of such systems with the present invention as set forth in the remainder of the present application with reference to the drawings.

BRIEF SUMMARY

Aspects of the present invention are aimed at reducing or eliminating the above problems with the prior art batch processing techniques, for example for unordered or arbitrary data sets. In particular, but not exclusively, aspects of the invention are directed to enabling a reduction in the overall amount of data to be processed, while still retaining the ability to process the data sets, or groups of data sets, individually.

To this end, aspects of the invention comprise a method of preparing a batch of data sets for a batch processing by a predetermined correlation encoding operation, the method including an analysis step of analyzing the batch of data sets to determine a plurality of correlation parameters representing degrees of correlation between member data sets of said batch of data sets, and an optimization step of using the plurality of correlation parameters to generate an optimized correlation dependency graph of the member sets performing the predetermined correlation encoding operation.

According to a variant of the method of the invention, the analysis step determines the correlation parameters in accordance with one or more predetermined correlation metrics for the predetermined correlation encoding operation.

According to a variant of the method of the invention, the method comprises a pre-analysis step of determining in the batch of data sets an optimized data subdivision and/or an optimized correlation metric for performing the correlation analysis step.

According to a variant of the method of the invention, the correlation optimization step generates an optimized correlation dependency graph which maximizes the overall correlation parameter values between the data sets.

According to a variant of the method of the invention, the method further comprises the predetermined correlation encoding operation, in which the batch of data sets is correlation-encoded in a sequence determined by the optimized correlation dependency graph.

According to a variant of the method of the invention, the correlation encoding operation generates a plurality of correlation-encoded delta sets, for performing a predetermined data set processing operation.

According to a variant of the method of the invention, the method comprises a delta encoding step, wherein the delta sets are compressed and/or encoded for the data set processing operation.

According to a variant of the method of the invention, the delta encoding step performs a further correlation analysis and/or correlation optimization step on the delta sets.

Aspects of the invention also envisage a system for preparing a batch of data sets for a batch processing using a predetermined correlation encoding operation, the system performing: 1) correlation analysis, wherein a processor is used for analyzing the batch of data sets to determine a plurality of correlation parameters representing degrees of correlation between member data sets of said batch of data sets; and 2) correlation optimization, wherein the processor uses the plurality of correlation parameters to generate an optimized correlation dependency graph of the member sets for performing the predetermined correlation encoding operation.

According to a variant of the system of the invention, the correlation analysis is adapted to determine the correlation parameters in accordance with one or more predetermined correlation metrics for the predetermined correlation encoding operation.

According to a variant of the system of the invention, the processor determines an optimized data subdivision and/or an optimized correlation metric for performing the correlation analysis step.

According to a variant of the system of the invention, the correlation optimization is adapted to generate an optimized correlation dependency graph which maximizes the overall correlation parameter values between the data sets.

According to a variant of the system of the invention, the processor performs the predetermined correlation encoding operation on the batch of data sets in a sequence determined by the optimized correlation dependency graph.

According to a variant of the system of the invention, the correlation encoding operation is adapted to generate a plurality of correlation-encoded delta sets, for performing a predetermined data set processing operation.

According to a variant of the system of the invention, the processor performs a delta encoding for compressing and/or encoding the delta sets for the predetermined data set processing operation.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The invention will now be described in greater detail with reference to accompanying figures, in which.

The figures are given by way of example only, and are not intended to limit the scope of the invention, which is set out in the appended claims. Where the same reference signs

DETAILED DESCRIPTION

Figure 1:
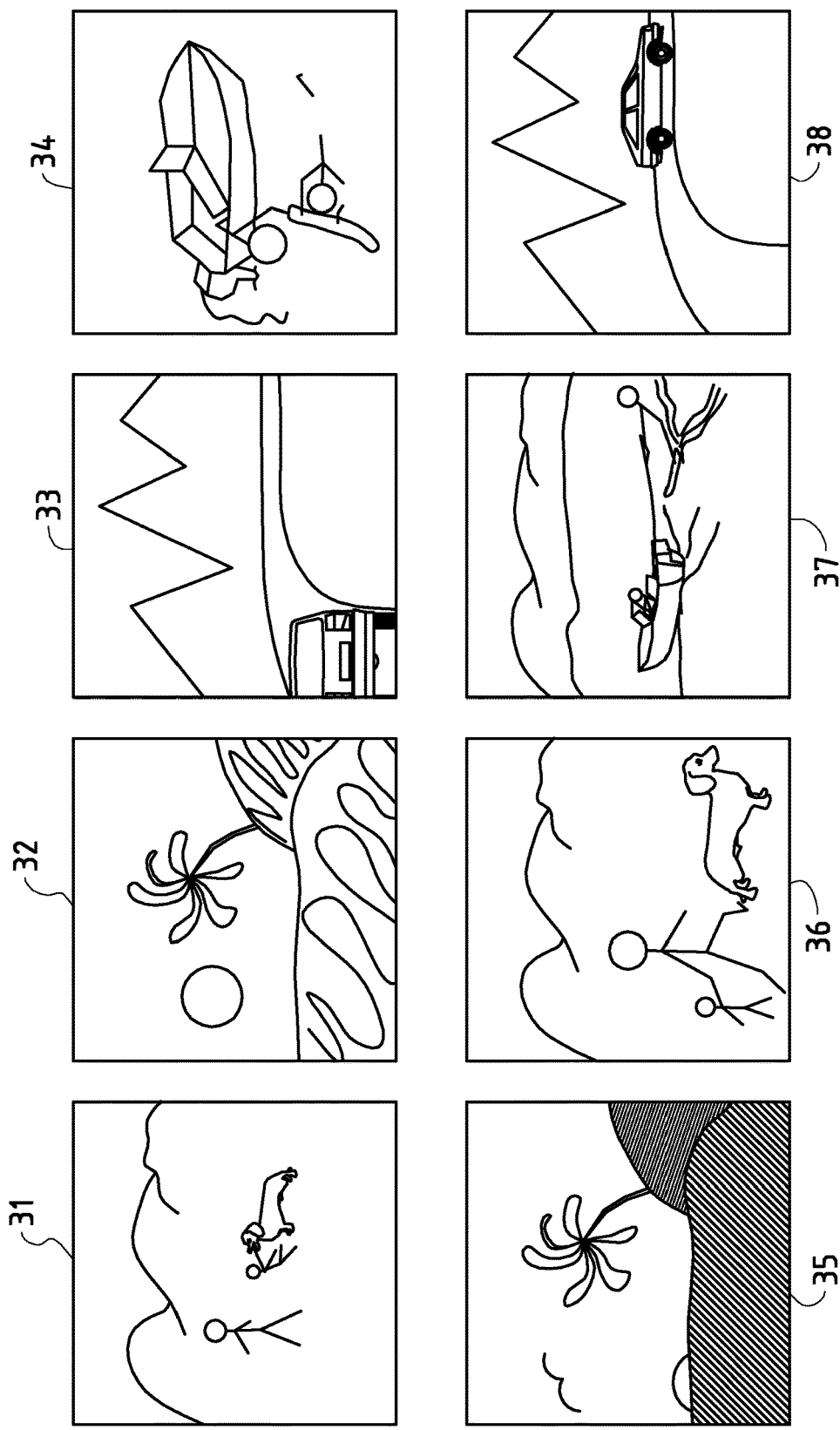
FIG. 1 shows an example of data sets (pictures) to be processed.

FIG. 1 shows an example of a batch of data sets—photographs 31 to 38, which may for example be stored in the memory of a camera. The sequence of the data sets is arbitrary and has no significance for batch data processing purposes. The content of each data set (image) in this example is not systematically related to the content of other data sets in the batch. If the camera user wishes to transfer the eight files via Bluetooth® to his or her laptop, or upload them to a web-server via a mobile wireless connection, it is irrelevant to him or her in which order the images are transmitted.

In prior art systems, the photographs would either be transferred as individual files (possibly having been individually compressed), or they might be compressed as a batch and transferred as one compressed file.

By applying principles of the present invention, on the other hand, the images of FIG. 1 could be correlation-encoded before transferring in order to reduce the total amount of data transferred (and hence reduce the required bandwidth and/or transfer time for the transfer). However, the photographs are not strongly correlated, as would usually be the case with a sequence of video images. Nevertheless, there are correlation relationships between the photographs, and these correlation relationships can be exploited to achieve a significant reduction in the amount of data to be transferred. Photographs 31 and 36, for example, have similar backgrounds (hills) and contain similar image features (people and dog). Photographs 33 and 38 share the same road and background, while the beach scenes of photographs 35 and 32 are very similar except for the intensity levels of the foreground. Photos 37 and 34 share little content, but the pixels and pixel patterns which make up these images may share common characteristics which can be used in a correlation encoding process to significantly reduce the amount of data redundancy between the two photos.

The optimization process may comprise maximizing the degree of correlation between images in the batch. The term "correlation" is used here in a broad sense. In a simple case, the term may be taken to refer to a straightforward correlation between two variables, or two sets of variables, such as the pixel intensity patterns of two different images. Or it may be understood to mean a more complex metric such as a multidimensional correlation mapping in which the mapping vector comprises multiple partial correlations, each partial correlation being between two variables. Alternatively, the term may be understood to mean a multiple correlation between multiple variables, representable for example as a linear regression among n variables in an n-dimensional space.

The terms "correlation analysis", "correlation optimization" and "correlation processing" are used in this description to describe distinct process steps. Correlation analysis and optimization are initial steps. The term "correlation processing" is used to refer to a subsequent step, such as delta encoding, which is subsequently performed on the batch of data sets which have been ordered as a result of the correlation analysis and optimization steps. Where the term "subsequent processing" is used, it refers to the correlation processing (e.g., correlation or delta encoding) or to the combination of correlation processing and a further step such as transfer or storage or other processing which may be performed on the batch of correlation-processed (correlation-encoded) data-sets (images).

In the simple case described below, the correlation analysis and optimization may use an unvarying metric (all correlations between pairs of images, for example, are calculated using the same correlation metric). However, it is also possible to vary the metric during the process (dynamically, for example, in response to analysis results determined during the process, or according to a predetermined variation scheme) in order to achieve an optimized correlation measure for the batch of data-sets or for particular sub-sets of the batch of data-sets.

The correlation optimization process may also comprise maximizing an overall (total) amount of inter-data-set correlation within the batch. This step is sometimes referred to as minimizing the entropy of a batch of data sets. The efficiency of the subsequent processing strongly depends on the order (or dependency arrangement) in which the data-sets (images) are processed, as will be seen later. A pre-defined correlation metric, selected as suitable for the subsequent correlation processing to be performed on the batch of data sets, can be used in the correlation analysis and optimization steps to determine the correlation "distances" or degree of correlation between data sets (e.g. images). Where the subsequent processing comprises batch image transfers, such a correlation metric might for example indicate the degree of similarity between pairs of images. Once all correlation parameters between the pairs of images in the batch have been determined, an optimized image sequence can be found by ordering or arranging the images in a way which will maximize the efficiency (minimize transfer time, for example) of the subsequent processing.

In a simple variant, the degree of correlation between two given images may be treated as a constant for a given correlation metric, and the correlation parameters could in this case be represented as a matrix of correlations between pairs of images. However, a further improvement to the correlation optimization may in some cases be obtained by varying the correlation metric during the correlation analysis in order to achieve a yet greater optimization of the degree of correlations between the data sets.

Figure 2:
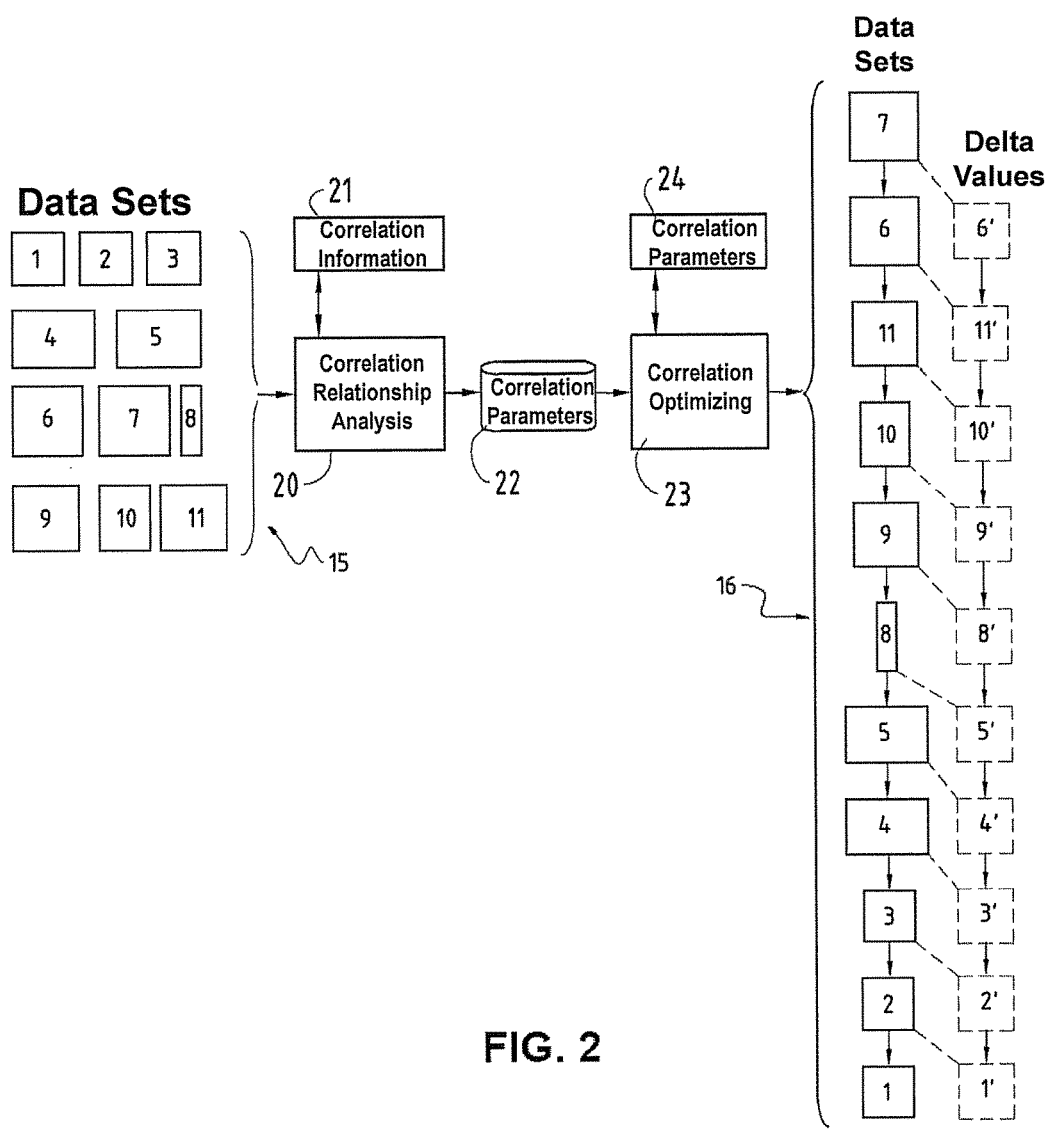
FIG. 2 shows a schematic view of a system according to a first embodiment of the invention.

FIG. 2 shows in schematic view an example of a system according to an embodiment of the invention. In the example shown, data sets 1-11, collectively referred to as batch 15, represent an arbitrary collection of data sets with unknown intercorrelation between the data sets. They may be photographs, as in FIG. 1, for example. The data sets are analyzed for correlation by correlation relationship analysis 20, which builds a set of correlation parameters 22, each correlation parameter representing the degree of correlation between data sets. In a simple implementation of the system, the correlation parameters may represent pairwise correlations between pairs of data sets, but in other implementations the correlation parameters may also be between permutations of multiple data sets. In analyzing correlation relationships between data sets, the correlation relationship analysis 20 may refer to correlation metric information 21, which can be used to define or control the correlation analysis process. The correlation metric information 21 may impose restrictions or priorities, for example, on the kinds of correlation which are to be detected or measured between data sets. Thus, for example, in a digital camera in which all images share the same size and color space; these characteristics may be excluded from correlation analysis. For greyscale images, the correlation control information 21 may specify that color parameters should be ignored, or (for example if the greyscale images are scanned text documents) that vector patterns are to be given a higher weighting than, say, local raster pixel patterns. The nature of the correlation metric information 21, and therefore the nature of the correlation analysis performed by correlation relationship analysis 20, may depend largely on the type of encoding process which is to be performed subsequently. The correlation metric information 21 may also be amended to take into account the results of correlation analysis and/or optimization operations which are carried out. In this way, the correlation metric information 21 can act as a knowledge base, accumulating rules, parameters and other information which can be used for defining or controlling future correlation analysis operations.

In the example shown, the correlation analysis 20 produces a set 22 of correlation parameters which represent correlations, according to rules specified by correlation control information 21, between the various data sets 1 to 11. Each of these correlation parameters may specify, for example, the type(s) of the correlation, as well as specifying which data sets the correlation was found amongst, and the degree of the correlation (which may be expressed for example as an objective or a relative value).

Once the correlation analysis has been performed by the correlation relationship analysis 20, the resulting correlation parameters 22 are then used by correlation optimizing 23 to generate an optimized dependency graph 16, which defines an optimized pattern for performing a subsequent processing (not shown) of data sets 1-11. Correlation optimizing 23 may call on additional correlation optimization parameters (rules, heuristics etc.), which may be predetermined for a particular application or a particular type of batch 15 of data sets 1-11.

In the example shown in FIG. 2, the optimized encoding graph 16 is a linear sequence which starts with data set 7 and proceeds through 6, 11, 10, 9 etc. to data set 1. The subsequent correlation encoding of data sets 7 through 1 in the sequence 16 may comprise: take data set 7 as it is, then determine the set 6' of delta values for data set 6 (the correlation parameters which relate data set 6 to data set 7), then determine the set 11' of delta values for data set 11 (the correlation parameters which relate data set 11 to data set 6), and so on, until the last set 1' of delta values is determined for the sequence 16. Subsequent processing may then be carried out on data set 7 and delta sets 6' to 1', in place of the original data sets 7 to 1, in sequence 16.

Note that the term "optimized" is used in this context to mean improved (i.e., changed towards an optimum state). The term "optimized" does not necessarily mean that a particular optimum state is reached.

In the particular example of uploading a set of images to a web server, the first image 7 in the optimized sequence 16 could be uploaded as it is (or compressed using a known compression technique and then uploaded), while the remaining images 6 to 1 need not be transferred. Instead, their corresponding sets of delta values 6' to 1' could be successively uploaded. Optionally, the delta sets 6' to 1' could also be individually compressed, or they could be subject to a similar correlation optimization process as for the original data sets (giving rise to a multi-pass or recursive correlation-optimization process).

In such a multi-pass or recursive correlation analysis/optimization process, the delta sets produced by one particular correlation analysis/optimization process may themselves be subject to a further correlation analysis/optimization process, thereby enabling a yet greater degree of correlation encoding.

There are many types of correlation metric which may be taken into account when optimizing the correlation between data sets. In the case of images, for example (FIG. 1), correlation may be based on one or more metrics—temporal, spatial, contour, vector, color, size, format, etc. Other parameters, such contextual parameters, may also be used. Examples of contextual parameters are given in the "Parthenon" example later in this description.

Furthermore, the correlation analysis need not simply be between two data sets, but could include clustering or correlation across different permutations of multiple data sets.

Note that correlation relationship analysis 20 and correlation optimizing 23 may be dedicated hardware units (e.g. electronic circuits), or they may be implemented as software in a computing unit. One or more neural networks may be used, for example to implement a Kohonen-type mapping from a set of predictor parameters (information known about the batch 15 and/or about individual data sets 1-11, for example) to a correlation space, in which the correlations between data sets can be more quickly and/or more effectively determined.

Referring back to FIG. 1, it can be seen that a correlation optimization process as described above might generate an optimized sequence, for example, of 31, 36, 37, 34, 32, 35, 33, 38, merely taking into account the visible features of the photographs. In practice, the correlation analysis may be performed in a much more detailed fashion, comparing pixel patterns, vector patterns, etc. using any of the many known image correlation techniques.

A rather simple example has been used to illustrate one embodiment the invention, but in fact the correlation optimization process may be significantly more complex in other embodiments. A pre-analysis step may be included, for example, to analyses the batch 15 of data sets 1-11 to determine an optimum collection of data sets (which may be divided differently from the original data sets 1-11) and to identify optimized sizes or formats of the data sets on which the actual correlation analysis will be performed. In the case of the example of FIG. 1, for example, a pre-analysis step might determine that the correlation analysis step would be more efficient if the batch of images were divided up into blocks of pixels of a particular size. Or the pre-analysis step might determine that the correlation analysis step would be more efficient if the batch of images were divided up by extracting certain macro-features (e.g. dog, beach, palm, hills, mountain etc.) and treating each of the extracted macro-features as a data set in its own right. Macro-features identified in the pre-analysis step may be stored for later use in the subsequent processing.

Such pre-analysis, correlation analysis and optimization steps may be computationally demanding, especially in small portable devices such as mobile phones or digital cameras. For this reason, one or more of these steps may be performed during a down time of the device. It is also possible to use heuristic methods for one or more of these steps. If iterative techniques are used for the pre-analysis, correlation analysis and/or optimization steps, then these steps can be performed in the background or during down time until a predetermined amount of analysis and/or optimization has been performed.

Once the correlation analysis and/or optimization steps have determined which data set(s) should be processed first (i.e. processed without correlation encoding), the subsequent processing of this/these data sets can begin. In this case, the analysis and/or optimization of the remaining data sets can continue while the first data set(s) is/are being processed. In this manner, the method makes full use of the time available for achieving an optimized correlation dependency graph.

The analysis and optimization can continue until there are no more delta value sets to analysis/optimize (e.g. when the processing of the penultimate delta set has begun, and only the last delta set remains to be processed.

If the correlation processing of the analyzed/optimized batch is interrupted, the processing need not start from the beginning again, but can simply continue from the point it had reached when it was interrupted. The processing can either continue with the next unprocessed delta set, or it can take the next unprocessed original data set as a starting point. Furthermore, the data set and delta sets which had been transferred before the interruption can be treated as fully-processed (e.g. fully transferred) data sets. This is in marked contrast to the "all or nothing" operation of some prior art methods of processing compressed data sets (e.g. zipping of batches of image files), in which the entire zipped file must be processed (e.g. transferred) before any of the individual data sets can be regarded as fully processed.

Figure 3:
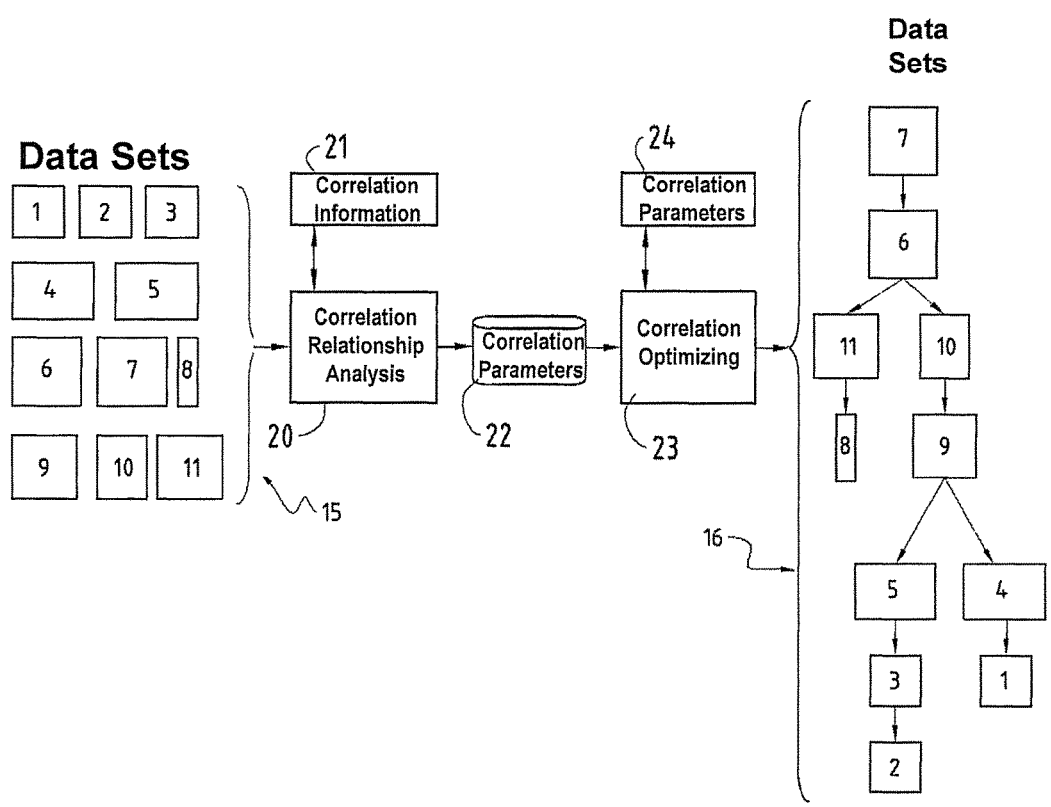
FIG. 3 shows a schematic view of a system according to a second embodiment of the invention.

FIG. 3 shows an analysis/optimization procedure similar to that of FIG. 2, except that the resulting optimized correlation dependency graph 16 is not a linear sequence but a branching structure, branching at data sets 6 and 9. Such optimized dependency graphs may have virtually any dependency structure.

The correlation dependency graph 16 shown in FIG. 3 has only one first (or starting) data set, 7, as with the correlation dependency graph shown in FIG. 2. However, there may be instances where the correlation analysis/optimization process determines that the subsequent processing will be more efficient if the data graph comprises multiple first data sets. In this case, the dependency graph(s) generated by the correlation optimization 23 will have more than one "starting" data set, each of which will need to be processed as a complete data set, and each of which may have other delta sets dependent on it.

In the above examples, the correlation optimization is described as being carried out on the basis of an analysis of (only) the data sets which are to be batch processed. However, the correlation optimization may also take into account data sets which are not part of the batch to be processed. This variant presents at least two possible advantages over the simpler case: it can improve the correlation optimization, and it can in certain cases obviate the processing of "starting" data sets, with the result that all of the data sets in the batch of data sets can be processed in their delta/correlation encoded form.

Generally, the more data sets are taken into account when calculating the correlation optimization, the greater will be the degree of correlation optimization, and the more efficient will be the subsequent correlation encoding of the data sets for processing.

Figure 4:
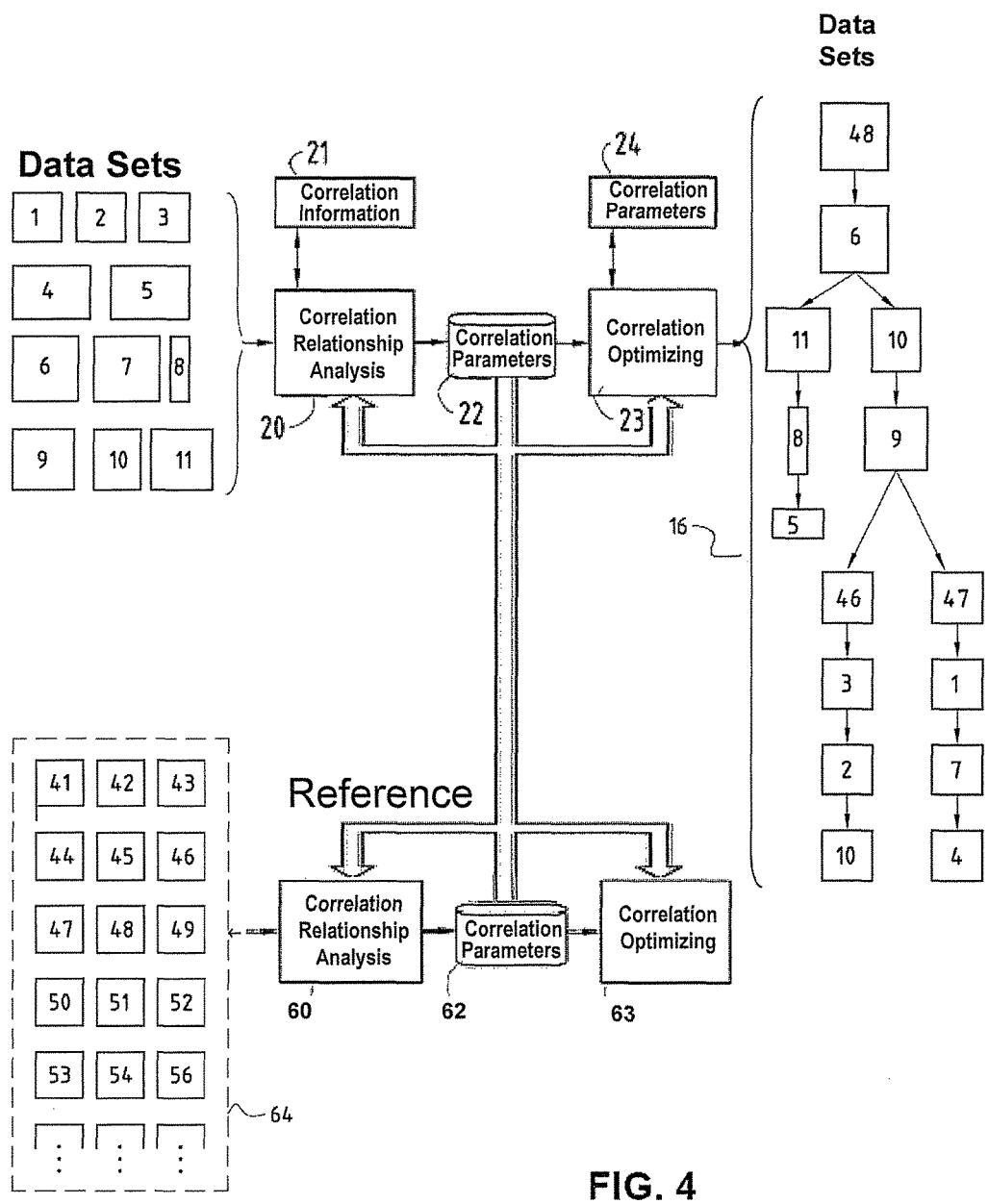
FIG. 4 shows a schematic view of a system according to a third embodiment of the invention.
Figure 5:
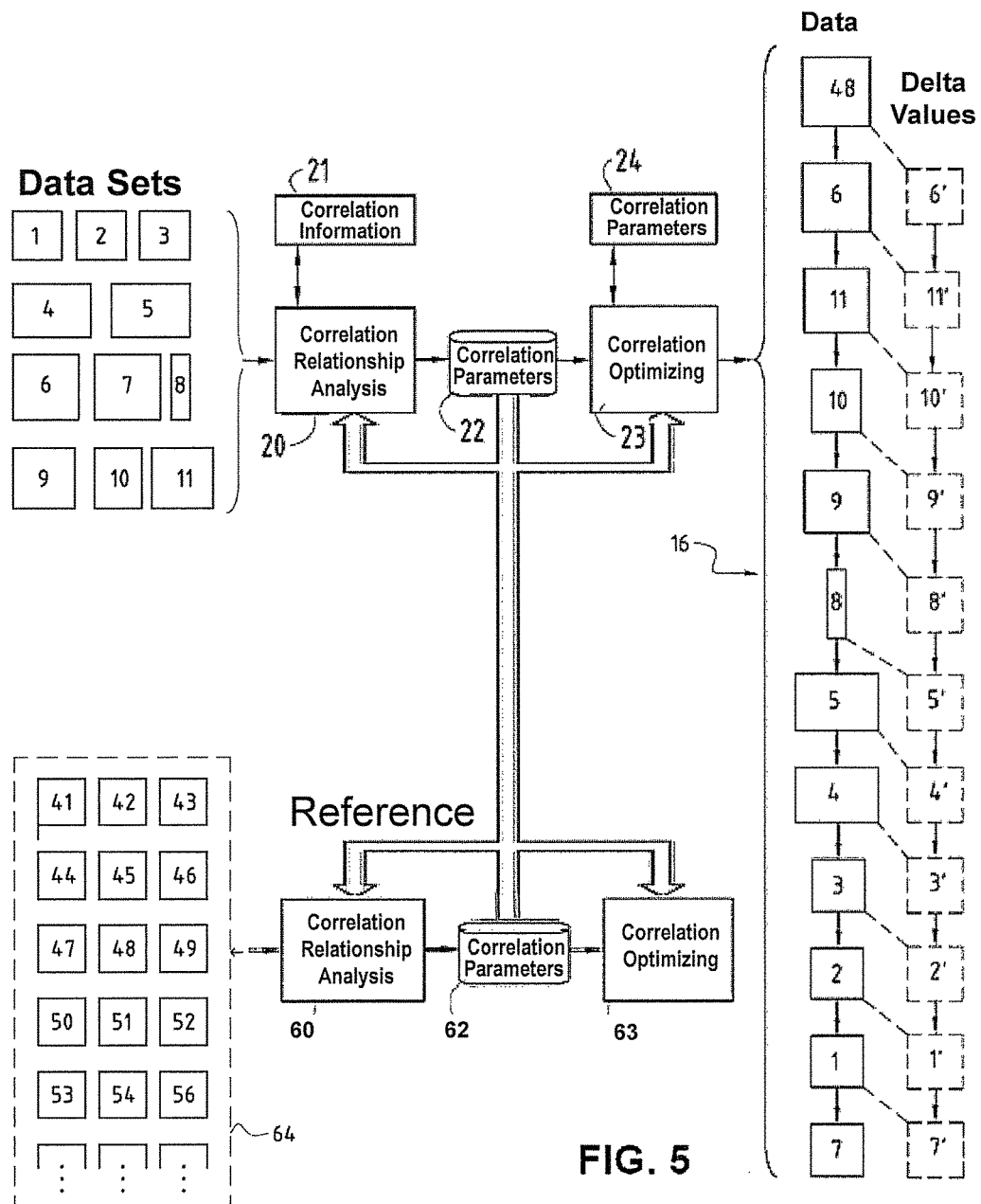
FIG. 5 shows a schematic view of a system according to a fourth embodiment of the invention.

FIGS. 4 and 5 illustrate variants of this embodiment in schematic form. FIG. 4 shows how the embodiment illustrated in FIG. 2 can be adapted such that correlation optimization is performed not merely on the batch of data-sets 15, but also on a plurality of reference data-sets 41 to 56, which are collectively indicated as 64. The correlation optimization calculations may be carried out by correlation relationship analysis 20 and/or by reference correlation relationship analysis 60, using correlation metric information 21 which can be used to define or control the correlation analysis processing performed by correlation relationship analysis 20 and/or by reference correlation relationship analysis 60.

The correlation analysis processing results in produces sets 22 and/or 62 of correlation parameters which represent correlations, according to rules specified by correlation control information 21, between the various data sets 1 to 11 and/or between data sets 41 to 56, in a manner similar to that described earlier in this description. Reference correlation parameters 62 may be pre-generated, based on the reference data sets 64, or they may be generated on the fly, in dependence of the correlation analysis being carried out on the batch 15 of data sets 1-11 to be batch processed.

The correlation parameters 22 and/or 62 may then be used by correlation optimizing 23 and/or 63 to generate an optimized dependency graph 16, which defines an optimized pattern for performing a subsequent processing (not shown) of batch 15 of data sets 1-11 and reference data sets 64. In the example shown in FIG. 4, the optimized encoding graph 16 is a linear sequence which starts with data set 48 and proceeds through 6, 11, 10, 9 etc. to data set 1. Reference data set may for example be a data set which has already been subjected to correlation processing (for example, it may be an image which has already been uploaded, or a data-set which has already been compressed). In the illustrated case, data sets 1 to 11 have been reordered in a sequence 6, 11, 10, 9, 8, 5, 4, 3, 2, 1, 7 which is optimized for a subsequent processing operation. In this case, the correlation analysis processing determined that reference data set 48 offered an optimized starting data set. The subsequent processing can then be performed on the sequence of data sets 48, 6, 11, 10, 9, 8, 5, 4, 3, 2, 1, 7. The sequence of correlation-processed data sets would then be 48, 6', 11', 10', 9', 8', 5', 4', 3', 2', 1', 7'.

In some cases it may not be necessary to perform the correlation processing on the reference data set 48, in which case only the sequence 6, 11, 10, 9, 8, 5, 4, 3, 2, 1, 7 need be subjected to correlation processing. The sequence of correlation-processed data sets would then be (as illustrated in FIG. 4 dashed lines) 6', 11', 10', 9', 8', 5', 4', 3', 2', 1', 7'.

FIG. 5 shows how the embodiment illustrated in FIG. 3 can be adapted such that correlation optimization is performed not merely on the batch of data-sets 15, but also on a plurality of reference data-sets 41 to 56, which are collectively indicated as 64. As will be understood, this variant is analogous to the adaptation illustrated in FIG. 4, with the exception that a more complex graph structure 16 is generated, comprising multiple "starting" data sets.

At some stage in the procedure, the data sets 1-11 in the batch 15 may be added to the reference data sets 64. In this way, the number of reference data sets 64 can be increased to give improved reference data for future correlation analysis processing. Correlation parameters 22, 24, 62, 64 may also be accumulated in a knowledge base and made available for future correlation analysis and/or correlation optimization processing.

The above variants will now be illustrated using an example of how the method of the invention can be practically implemented.

Taking the example of uploading a batch of photos to a server (for example a webserver), it is possible to use characteristics of images which are already on the server in order to improve the correlation optimization process. It may for example be the case that a number of images are stored both in the local device (e.g. camera or mobile phone) as well as on the server (some of the images may previously have been uploaded, for example). In such a case, the correlation optimization can be performed locally—not only on the batch of images to be uploaded, but also on other locally-stored images, which are known to be also stored on the server. This variant has two additional advantages: firstly the correlation optimization is performed across a larger number of images than merely the batch of images to be processed, and therefore results in an improved set of correlation parameters for the subsequent processing and uploading. And secondly, the correlation optimization can be performed such that the "starting" image(s) is/are selected to be one of the images already on the server; in this case, it is not necessary to transfer the starting image(s) to the server at all, and all of the images in the batch to be uploaded can be uploaded as correlation encoded data.

When the encoded images are uploaded, they can be accompanied or preceded by a parameter set which includes all the information required for decoding the uploaded images once they arrive at the server. This parameter set may for example include an indication of which image (already on the server) should be taken as the starting image, and details of the encoding (e.g. correlation function) which was used to encode the images in the batch. The server can then use this information to decode the images, whereupon the uploaded images can also be added to the number of images which is available for future correlation optimization processing of images.

It is thus possible to avoid processing any full data sets (uploading any whole images), and this can significantly reduce the total amount of data to be processed (uploaded). This method can also be used for a "batch" which includes just a single data set (image)—in this case, correlation optimization can be performed on a plurality of images which includes the single image itself and at least one image which is known to be already on the server, to determine an optimized selection of correlation parameters to use in encoding the single image for uploading. The optimized correlation parameters can include the selection of a reference ("starting") image and/or the selection of an optimal correlation function, for example.

The above example describes a case in which correlation optimization is performed using a) the batch of data sets (images) to be processed (uploaded from the local device to the server) and b) a separate group of one or more other data sets (reference images) which are on both the local device and the server. However, it is also possible to adapt the method for use in situations where these "reference" images are on the server but are not necessarily available locally, in which case the correlation optimization can be performed on a) the batch of data sets (images) to be processed (uploaded from the local device to the server), as above, and b) a separate group of one or more other data sets (reference images) which are on the server. In this case, the correlation analysis processing can be partitioned into at least a first correlation analysis processing, in which the reference images on the server are correlation-analyzed on the server, and a second correlation analysis processing, in which the batch of images to be uploaded are correlation-analyzed on the local device. The second correlation analysis processing may use the results of the first correlation analysis processing in order to achieve further optimized correlation parameters (e.g. starting image, correlation function) which can be used for the subsequent encoding and processing. Again in this way it is possible to select a starting image which is already on the server, thus obviating the need for uploading any whole (unencoded) images.

Depending on the particular application of this method, some or all of the reference data sets 64, the reference correlation relationship analysis 60, the reference correlation parameters 62 and reference correlation optimizing 63 may be implemented temporarily and/or spatially remote from the data sets 15, the correlation relationship analysis 20, the correlation parameters 22 and/or correlation optimizing 23. Thus, while the correlation relationship analysis and/or the correlation optimization may be computed in a local computing unit (not shown), the reference correlation parameters 22 may be pre-computed and/or computed on a remote server unit (not illustrated), accessed for example via a wireless, mobile or wired network.

It is of course desirable to avoid the need for transferring large quantities of data between the local and remote computing units in such a case. However, if the local correlation analysis 22 is to be able to refer to the reference data sets 64, it requires access to some information about the remote reference data sets 41 to 56. This problem can be overcome, for example, by pre-computing a set of correlation analysis information and making it available for access by the local correlation analysis 22. Alternatively, abstracted versions of the reference data sets may be made available. This abstraction can be a simple data-reduction (e.g. a reduction in resolution if the data sets are images), or it can be a more intelligent analysis of the data sets to extract representative patterns or elements from the data sets. The abstraction techniques could also be combined.

In this way, correlation analysis 22 can have access to a large number of reference data sets 64, and thereby greatly improve the correlation encoding of the batch 15 of data sets 1 to 11 which can be achieved.

A similar method can also be implemented in order to make information about the batch 15 of data sets 1-11 available to the reference (or remote) correlation analysis 62. In this case, all or most of the correlation analysis can be carried out by the reference correlation analysis 62, on the basis of parameters abstracted from the batch 15 of data sets 1-11. The correlation optimization processing may of the data sets 1-11 may then be carried out by correlation optimization 23 or by reference correlation optimization 63.

As an illustration of how this method may be used in practice, we take an example of the Johnson family on holiday in Athens. Mrs. Johnson takes many photographs of the children in front of the Parthenon, and wishes to upload the photographs to her account on a cloud-based image management server. Mrs. Johnson has a very good camera which takes high-quality photographs, each of which is stored as a very large file. However, internet access is slow and expensive, and the Johnsons wish to upload the image files from their camera to their server as quickly as possible.

Luckily, many other families have previously taken photographs of children in front of the Parthenon and uploaded them to the same cloud-based image management server. Many of the photographs are tagged with the GPS location or with the tags "Parthenon" or "Acropolis", or with date, time or other information, and the server has performed extensive correlation analysis on the many photographs, and it has generated a highly optimized set of correlation parameters, which it makes available for encoding and uploading new images to the server.

The correlation optimization calculations can be performed by a processing unit local to Mrs. Johnson's camera (e.g. in the camera or on her laptop), or on the server, or on a different server, or on any combination of such computing units.

When Mrs. Johnson's camera connects to the server, it may transfer a batch of images which have already been encoded in a correlation-optimized fashion, with the correlation optimization based upon the batch of images, or upon the batch of images and other images available locally. In an alternative mode, the camera may submit to the server a set of parameters which can be used by the server to carry out correlation optimization calculations based on images stored on the server, or available to the server. Such parameters may include parameters extracted by analysis (e.g. by pattern recognition) from the photographs. Such parameters also may include, for example, details of the camera settings or other parameters associated with each photograph at the time the photograph was taken, or associated with the batch generally. Such parameters might include, for example, a GPS location of the camera, an angular/geographical orientation of the camera, a model type of the camera, a zoom setting of the camera lens, a time of day, an accelerometer sensor measurement, etc. The server may then use some or all of this information, and possibly other information from other sources, such as prevailing weather conditions at the given time(s) and location(s), the angle(s) of the sun or moon at the time(s) and location(s), etc.), in order to select an image, or a set or images, or a pre-computed set of correlation optimization information, which can then be used to calculate optimized correlation parameters for processing (uploading) the photographs.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for image processing, the method comprising:
   producing a plurality of correlation parameters, each correlation parameter representing a degree of correlation between two images of a plurality of images, the plurality of images having a first ordering independent of the plurality of correlation parameters;
   producing a second ordering dependent on the plurality of correlation parameters; and
   delta encoding the plurality of images according to the second ordering.

2. The method of claim 1, comprising producing the plurality of correlation parameters in accordance with one or more correlation metrics associated with a delta encoding operation.

3. The method of claim 1, comprising producing an optimized subdivision of the plurality of images.

4. The method of claim 1, comprising producing two or more pluralities of correlation parameters, each plurality of correlation parameters being produced in accordance with a different correlation metric.

5. The method of claim 4, comprising producing an optimized correlation metric according to a comparison of the two or more pluralities of correlation parameters.

6. The method of claim 1, wherein the second ordering indicates a maximum of the plurality of correlation parameters.

7. The method of claim 1, wherein the second ordering comprises a first image followed by one or more dependent images, each of the one or more dependent images are delta encoded according to the first image.

8. A system for image processing, the system comprising:
   a processor that is operable to:
      produce a plurality of correlation parameters representing degrees of correlation between two images of a plurality of images, the plurality of images having a first ordering independent of the plurality of correlation parameters;
      produce a second ordering dependent on the plurality of correlation parameters; and
      delta encode the plurality of images according to the second ordering.

9. The system of claim 8, wherein the processor is operable to produce the plurality of correlation parameters in accordance with one or more correlation metrics associated with a delta encoding operation.

10. The system of claim 8, wherein the processor is operable to produce an optimized subdivision of the plurality of images.

11. The system of claim 8, wherein the processor is operable to produce two or more pluralities of correlation parameters, each plurality of correlation parameters being produced in accordance with a different correlation metric.

12. The system of claim 11, wherein the processor is operable to produce an optimized correlation metric according to a comparison of the two or more pluralities of correlation parameters.

13. The system of claim 8, wherein the processor is operable to produce the second ordering to indicate a maximum of the plurality of correlation parameters.

14. The system of claim 8, wherein the processor is operable to delta encode one or more dependent images, each of the one or more dependent images are delta encoded according to a first image.

15. A camera, the camera comprising:
   a memory for storing a plurality of images; and
   a processor that is operable to:
      produce a plurality of correlation parameters representing degrees of correlation between two images of a plurality of images, the plurality of images having a first ordering independent of the plurality of correlation parameters;
      produce a second ordering dependent on the plurality of correlation parameters; and
      delta encode the plurality of images according to the second ordering.

16. The camera of claim 15, wherein the processor is operable to produce the plurality of correlation parameters in accordance with one or more correlation metrics associated with a delta encoding operation.

17. The camera of claim 15, wherein the processor is operable to produce an optimized subdivision of the plurality of images.

18. The camera of claim 15, wherein the processor is operable to produce two or more pluralities of correlation parameters, each plurality of correlation parameters being produced in accordance with a different correlation metric.

19. The camera of claim 18, wherein the processor is operable to produce an optimized correlation metric according to a comparison of the two or more pluralities of correlation parameters.

20. The camera of claim 15, wherein the processor is operable to produce the second ordering to indicate a maximum of the plurality of correlation parameters, one or more dependent images being delta encoded according to a first image.

* * * * *